United States Patent
Fague

(10) Patent No.: US 6,193,792 B1
(45) Date of Patent: Feb. 27, 2001

(54) INK COMPOSITIONS FOR INK JET PRINTING

(75) Inventor: Gary R. Fague, Canandaigua, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/300,906

(22) Filed: Apr. 28, 1999

(51) Int. Cl.$^7$ .................................................. C09D 11/02
(52) U.S. Cl. ................................... 106/31.65; 106/31.86; 106/31.89
(58) Field of Search ............................. 106/31.65, 31.86, 106/31.89

(56) References Cited

U.S. PATENT DOCUMENTS

| | | | | |
|---|---|---|---|---|
| 5,656,071 | * | 8/1997 | Kappele et al. | 106/31.76 |
| 5,766,325 | * | 6/1998 | Gundlach et al. | 106/31.43 |
| 5,772,743 | * | 6/1998 | Gundlach et al. | 106/31.27 |
| 5,788,750 | * | 8/1998 | Gundlach et al. | 106/31.27 |
| 5,855,656 | * | 1/1999 | Gundlach et al. | 106/31.43 |

* cited by examiner

Primary Examiner—Helene Klemanski
Assistant Examiner—Veronica F. Faison
(74) Attorney, Agent, or Firm—Judith L. Byorick

(57) ABSTRACT

Disclosed is an ink composition which comprises (a) water, (b) a surfactant of the formula

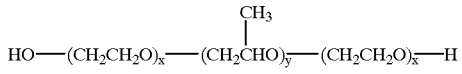

wherein the molecular weight of the polypropylene oxide block is about 900 and the ethylene oxide blocks constitute about 80 percent by weight of the molecule, (c) colored pigment particles, and (d) uncolored precipitated colloidal silica particles, wherein the ink has a pH of at least about 7.5 when measured at about 25° C.

20 Claims, No Drawings

INK COMPOSITIONS FOR INK JET PRINTING

The present invention is directed to improved ink compositions. More specifically, the present invention is directed to aqueous ink compositions which exhibit good performance in ink jet printing processes. One embodiment of the present invention is directed to an ink composition which comprises (a) water, (b) a surfactant of the formula

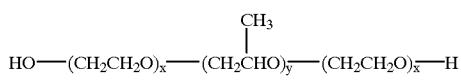

wherein the molecular weight of the polypropylene oxide block is about 900 and the ethylene oxide blocks constitute about 80 percent by weight of the molecule, (c) colored pigment particles, and (d) uncolored precipitated colloidal silica particles, wherein the ink has a pH of at least about 7.5 when measured at about 25° C.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of dropon-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the some high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

European Patent Publication EP 0 823 464 A1, the disclosure of which is totally incorporated herein by reference, discloses the use of a recording liquid for water based inkjet with pigment and colloidal silica, wherein prints recorded on plain paper exhibit good clearness, high quality, water resistance, and light resistance. Optionally, the ink can also contain an anionic or nonionic surfactant, such as fatty acid salts, alkyl sulfuric esters, alkyl aryl sulfonates, alkyl naphthalene sulfonates, dialkyl sulfonates, dialkyl sulfuric succinates, alkyl diaryl ether disulfonates, alkyl phosphates, polyoxyethylene alkyl ether sulfonates, polyoxyethylene alkyl aryl ether sulfonates, naphthalene sulfonic acid formaldehyde condensations, polyoxyethylene alkyl phosphoric acid esters, glycerol borate fatty acid esters, polyoxyethylene glycerol fatty acid esters, polyoxyethylene alkyl ethers, polyoxyethylene alkyl aryl ethers, polyoxyethyleneoxypropylene block copolymers, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene alkyl amines, fluorine types, silicon types, and the like, with one specific example provided being EMULGEN 420, obtained from Kao Corporation.

U.S. Pat. No. 5,221,332 (Kohimeier), the disclosure of which is totally incorporated herein by reference, discloses an ink composition which comprises an aqueous liquid vehicle, a colorant, and silica particles in an amount of from about 0.1 to about 5 percent by weight. The inks are particularly suited for ink jet printing processes, including thermal ink jet printing processes, and exhibit increased drop volume and increased drop velocity when employed in ink jet printing processes.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents.

U.S. Pat. No. 5,378,574 (Winnik et al.), the disclosure of which is totally incorporated herein by reference, discloses ink jet inks and liquid developers containing colored particles comprising hydrophilic porous silica particles to the surfaces of which dyes are covalently bonded through silane coupling agents.

U.S. Pat. No. 5,145,518 (Winnik et al.), the disclosure of which is totally incorporated herein by reference, discloses an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles. Optionally, silica is precipitated within the micelles. In a specific embodiment, the dye molecules are substantially colorless and the dye is detectable when exposed to radiation outside the visible wavelength range. In another specific embodiment, the ink also contains a colorant detectable in the visible wavelength range, such as a dye or a pigment.

U.S. Pat. No. 5,139,574 (Winnik et al.), the disclosure of which is totally incorporated herein by reference, discloses an ink composition which comprises an aqueous liquid vehicle, a water-soluble dye, and particles of a block copolymer of the formula ABA, wherein A represents a hydrophilic segment and B represents a hydrophobic segment, said ABA particles having an average particle diameter of about 300 Angstroms or less. The ink is particularly suitable for use in ink jet printing systems, especially thermal ink jet printing systems.

U.S. Pat. No. 5,275,647 (Winnik), the disclosure of which is totally incorporated herein by reference, discloses an ink composition comprising a solution which comprises surfactant micelles colored with a dye or dyes covalently attached thereto. Also disclosed is an ink jet printing process utilizing such ink.

U.S. Pat. No. 4,789,399 (Williams et al.), the disclosure of which is totally incorporated herein by reference, discloses a pressurized roller pen which includes a thixotropic viscoelastic ink that is a gel at rest but becomes a thin liquid under the shearing action of the pen's revolving ball point. The ink includes a polyacrylic resin polymer, at least one highly polar solvent, at least one solvent of low or medium polarity, and colloidal silica, together with pigments, dyes, surfactants, and/or pH modifiers.

Ink jet printing frequently is performed with a printhead which has a width less than that of the substrate to be printed. The printhead typically traverses across the substrate in a processing direction to print a swath, and the substrate is then advanced in a direction perpendicular or transverse to the processing direction, enabling the printhead to traverse the substrate again and print another swath adjacent to the already-printed swath. Stitch mottle is a phenomenon observed in ink jet printing when nonuniform unprinted areas (appearing, for example, white when printing on white paper) occur where the swaths meet during the printing process. During the printing process, the ink appears to "pull back" from the stitch/swath edges or lines before the ink dries, resulting in nonuniform images and image defects, especially in solid image areas, which appear as unprinted (white, for example, on white paper) lines running across the image in a direction parallel to the swath. The problem is particularly prominent when pigment colorants are employed in the ink.

Accordingly, while known compositions and processes are suitable for their intended purposes, a need remains for improved ink compositions suitable for ink jet printing processes. In addition, a need remains for ink compositions that exhibit reduced stitch mottle when used in ink jet printing applications. Further, a need remains for ink compositions that, when used in ink jet printing processes, enable generation of ink droplets of the required size and uniformity. Additionally, a need remains for ink compositions that, when used in ink jet printing processes enable generation of ink droplets which are jetted accurately onto the printing substrate (also referred to as reduced or eliminated drop satellites). There is also a need for ink compositions that enable reduced misdirected, partially clogged, or weak jets when used in an ink jet printing process. In addition, there is a need for ink compositions that enable ink jet printing processes resulting in images with reduced image defects such as misting, streamers, exploding jets, or jet dropout. Further, there is a need for ink compositions that enable ink jet printing processes resulting in images with desirable solid area optical density. Additionally, there is a need for ink compositions that enable ink jet printing processes resulting in images with reduced or eliminated areas of uneven drying, such as in horizontal or vertical bands or zones. A need also remains for ink compositions having desirable viscosity, pH, and surface tension characteristics for use in ink jet printing processes. In addition, a need remains for ink compositions with the above noted advantages that also contain pigment colorants. Further, a need remains for ink jet ink compositions containing relatively high amounts of pigment by weight. Additionally, a need remains for pigment containing ink jet inks that generate high quality images on transparencies and photopapers.

SUMMARY OF THE INVENTION

The present invention is directed to an ink composition which comprises (a) water, (b) a surfactant of the formula

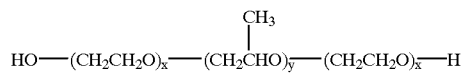

wherein the molecular weight of the polypropylene oxide block is about 900 and the ethylene oxide blocks constitute about 80 percent by weight of the molecule, (c) colored pigment particles, and (d) uncolored precipitated colloidal silica particles, wherein the ink has a pH of at least about 7.5 when measured at about 25° C.

DETAILED DESCRIPTION OF THE INVENTION

The inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges. Particularly preferred liquid vehicles for the inks of the present invention include water and one or more cosolvents such as sulfolane, trimethylolpropane, 2-pyrrolidinone, glycerine, and the like, as well as mixtures thereof.

Inks of the present invention further contain a surfactant of the formula

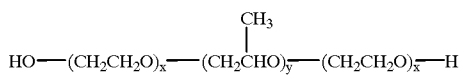

wherein the molecular weight of the polypropylene oxide block is about 900 and the ethylene oxide blocks constitute about 80 percent by weight of the molecule. Surfactants of this formula are available commercially as, for example, PLURONIC F-38, from BASF Corp. The surfactant is present in the ink in any desired or effective amount, typically from about 0.1 to about 5 percent by weight of the ink, preferably from about 1 to about 4 percent by weight of the ink, and more preferably from about 1.5 to about 3 percent by weight of the ink, although the amount can be outside of these ranges.

The inks of the present invention also contain a pigment. Examples of suitable pigments for the inks of the present invention include various carbon blacks such as channel black, furnace black, lamp block, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pear® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment Yellow 13), Hostafine® Yellow (Pigment Yellow 83), Hostafine® Red FRLL (Pigment Red 9), Hostafine® Rubine F6B (Pigment Red 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, dispersions available from BASF, including Disperse Black 00-6607, Luconyl Yellow 1250, Basoflex Pink 4810, Luconyl Blue 7050, and the like, dispersions available from Keystone Aniline Corp., such as Keystone Jet Print Micro Black (Pigment Black 7), Keystone Jet Print Micro Blue (Pigment Blue 15:3), Keystone Jet Print Micro Magenta (Pigment Red 122), Keystone Jet Print Micro Yellow (Pigment Yellow 13), and the like, dispersions available from Bayer AG, such as Bayscript Yellow P PZD 101440 (Pigment Yellow 74), Bayscript Magenta P PAD 101090 (Pigment Red 122), pigments available from Sun Chemical Corp., such as SUNSPERSE YELLOW YHD-9439 (Pigment Yellow 17), and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.05 to about 1 micron, although the particle size can be outside these ranges. Within the ink compositions of the present invention, the pigment is present in any effective amount to achieve the desired degree of coloration.

Typically, the pigment is present in an amount of from about 0.1 to about 8 percent by weight of the ink, and preferably from about 2 to about 7 percent by weight of the ink, although the amount can be outside these ranges.

In a particularly preferred embodiment, the inks of the present invention contain no dyes (i.e., colorants which are soluble in the liquid vehicle of the ink), including both those dyes visible to the naked eye and those dyes invisible to the naked eye but detectable at other wavelengths, such as infrared, ultraviolet, or the like, and including both free dye molecules and dye molecules covalently bonded to or physically attached to or associated with other ink components.

The pigment particles can, if desired, be present in combination with a dispersing or stabilizing agent. Examples of suitable stabilizing agents include anionic dispersants, such as polymers and copolymers of organic acids, such as acrylic acid, methacrylic acid, maleic acid, or the like, neutralized with a base to form the salt (with examples of suitable cations including $Na^+$, $Li^+$, $K^+$, $Cs^+$, $Rb^+$, substituted and unsubstituted ammonium cations, and the like, such as styreneacid copolymers, unsubstituted and substituted (such as alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) with an aldehyde derivative, such as unsubstituted alkyl aldehyde derivatives, including formaldehyde, acetaldehyde, propylaldehyde, and the like, as well as mixtures thereof. Specific examples of such stabilizing agents include commercial products such as Versa® 4, Versa® 7, Versa® 77 (National Starch and Chemical Co.); Lomar® D (Diamond Shamrock Chemical Co.); Daxad® 19, Daxad® K (W.R. Grace & Co.); Tamol® SN (Rohm & Haas); and the like. The dispersing or stabilizing agent, when present, typically is present in the ink in an amount of from about 2 to about 25 percent by weight of the pigment particles, although the amount can be outside of this range.

The inks of the present invention also contain uncolored precipitated colloidal silica particles. By "uncolored" is meant that the silica particles are used in the form in which they are synthesized or obtained from the manufacturer, and that the silica particles are not subjected to any treatment process to alter their color (which generally is white or colorless). By "precipitated" is meant silica particles that are prepared by treating organic silicones with caustic materials, such as potassium hydroxide, to yield small particles of $SiO_2$ dispersed in liquid, as opposed to "fumed" silica particles, which are prepared by burning silicon-containing compounds and which consist of particles bonded together in beads or chains. Examples of suitable precipitated colloidal silica particles include the LUDOX® materials, such as LUDOX LS, LUDOX SM, LUDOX AM, LUDOX TMA, and LUDOX TM, available from E.I. Du Pont de Nemours and Co. and from Aldrich Chemical Co., the SNOWTEX® materials, such as SNOWTEX ST-N, SNOWTEX ST-O, and SNOWTEX ST-C, available from Nissan Chemical Industries. Ltd., and the like. Preferred commercially available solutions of precipitated colloidal silica particles have pH values of 7 or above. Preferred average particle diameters are from about 5 to about 50 nanometers, more preferably from about 8 to about 30 nanometers, and even more preferably from about 8 to bout 22 nanometers, although the particle size can be outside of these ranges. The silica particles are present in the ink in an amount roughly equal, by weight, to the pigment particles present in the ink. More specifically, within the ink composition, pigment particles and the silica particles are present in a relative ratio, by weight, of from about 3 parts by weight pigment particles and about 1 part by weight silica particles to about 1 part by weight pigment particles and about 2 parts by weight silica particles, preferably from about 2 parts by weight pigment particles and about 1 part by weight silica particles to about 1 part by weight pigment particles and about 1.5 parts by weight silica particles, and more preferably from about 2 parts by weight pigment particles and about 1 part by weight silica particles to about 3 parts by weight pigment particles and about 4 parts by weight silica particles, although the relative amounts can be outside of these ranges. The silica particles typically are present in the ink in an amount of from about 0.1 to about 8 percent by weight of the ink, preferably from about 1 to about 5 percent by weight of the ink, and more preferably from about 2 to about 4 percent by weight of the ink, although the amount can be outside of these ranges.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or bases, phosphate salts, carboxylates salts, sulfite salts, amine salts, and the like, present in an amount of from 0 to about 1 percent by weight of the ink and preferably from about 0.01 to about 1 percent by weight of the ink, or the like. In a preferred embodiment, no chelating agents, such as the alkylene diamine tetraacetic acids, are necessary.

Ink compositions of the present invention generally have a pH of at least about 7.5, preferably from about 7.5 to about 11, more preferably at least about 8.5, and even more preferably from about 8.5 to about 9.5, although the pH can be outside of these ranges. One advantage of having the ink pH in these ranges is that colloidal silicas are stable particle dispersions in water at these pH values, and many pigment dispersing or stabilizing agents are in acid salt form, such as ammonium salts or the like, and may convert to the acid form at lower pH values.

The ink compositions are generally of a viscosity suitable for use in thermal ink jet printing processes. At room temperature (i.e., about 25° C.), typically, the ink viscosity is no more than about 10 centipoise, preferably is from about 1 to about 5 centipoise, more preferably from about 1 to about 4 centipoise, even more preferably from about 2 to about 4 centipoise, and still more preferably from about 2.5 to about 3.5 centipoise, although the viscosity can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Another process entails mixing all of the ink ingredients together except for the pigment and pigment dispersing agent, followed by adding this mixture to the pigment dispersion, mixing, and filtering.

The present invention is also directed to a process which entails incorporating the ink of the present invention into an ink jet printing apparatus and causing droplets of the ink to be ejected in an imagewise pattern onto a recording sheet. In one preferred embodiment, the printing apparatus employs a thermal ink jet process wherein the ink in the nozzles is selectively heated in an imagewise pattern, thereby causing droplets of the ink to be ejected in imagewise pattern. Any suitable substrate or recording sheet can be employed, including plain papers such as Xerox® 4024 papers, Xerox Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In one preferred embodiment, the process entails printing onto a porous or ink absorbent substrate, such as plain paper. In another preferred embodiment, the process entails printing onto a transparency material to generate prints suitable for overhead projection. Examples of suitable transparencies include Xerox® Inkjet transparencies, 3M® Inkjet Transparencies CG3460, H-P® Premium Transparency Films, and the like. In yet another preferred embodiment, the process entails printing onto a paper which has been surface treated to control spot size and retain the colorant on the surface, such as silica coated papers, including JuJo paper, photopapers, such as H-P® Glossy Photographic Paper, Xerox® Ink Jet Photo Glossy Paper, Kodak® Photo Gloss Paper, and the like. When printed onto media such as transparencies and photopapers, inks of the present invention enable advantages such as high image quality, permanence, and the like, particularly when used on large format printers. Inks of the present invention are particularly preferred when transparency recording sheets are used; the resulting images are bright, vivid, clear, and permanent, with no opacity. Yellow images are not shifted towards orange or brown, which might otherwise occur as a result of light scattering. The images on transparencies are also superior to those made by electrophotographic imaging processes, since electrophotographic transparency images can be rendered opaque by the presence of fuser oils.

In a preferred embodiment, the ink compositions of the present invention, when jetted with a 600 dpi thermal ink jet printer (such as an H-P 850C, service cartridge 51 645A), exhibit drop volumes of at least about 32 nanograms per drop, preferably from about 35 to about 45 nanograms per drop, and more preferably from about 38 to about 42 nanograms per drop, although the drop mass can be outside of these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| polyvinyl sulfonate, sodium salt (solution of 25 wt. % polymer in water) | 1.0 |
| sodium lauryl sulfate | 0.2 |
| LUDOX LS (dispersion of 30 wt. % precipitated silica particles in water) | 9.0 |
| deionized water | 43.6 |
| Keystone Aniline Jet Print Micro Blue (Pigment Blue 15:3; solution containing 20 wt. % pigment solids in water) | 18.0 |

The resulting ink composition had a pH of 8.5, a viscosity at 25° C. of 2.95 centipoise, and a surface tension of 40.7 dynes per centimeter.

EXAMPLE II

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| polyvinyl sulfonate, sodium salt (solution of 25 wt. % polymer in water) | 1.0 |
| sodium lauryl sulfate | 0.2 |
| LUDOX LS (dispersion of 30 wt. % precipitated silica particles in water) | 9.0 |
| deionized water | 25.6 |
| Keystone Aniline Jet Print Micro Blue (Pigment Blue 15:3; solution containing 20 wt. % pigment solids in water) | 36.0 |

The resulting ink composition had a pH of 8.5, a viscosity at 25° C. of 4.03 centipoise, and a surface tension of 38.2 dynes per centimeter.

EXAMPLE III

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| polyvinyl sulfonate, sodium salt (solution of 25 wt. % polymer in water) | 1.0 |
| sodium lauryl sulfate | 0.2 |
| SNOWTEX N (dispersion of 20 wt. % precipitated silica particles in water) | 15.0 |
| deionized water | 37.6 |
| Keystone Aniline Jet Print Micro Blue (Pigment Blue 15:3; solution containing 20 wt. % pigment solids in water) | 18.0 |

The resulting ink composition had a pH of 8.8, a viscosity at 25° C. of 2.88 centipoise, and a surface tension of 40.5 dynes per centimeter.

EXAMPLE IV

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| polyvinyl sulfonate, sodium salt (solution of 25 wt. % polymer in water) | 1.0 |
| sodium lauryl sulfate | 0.2 |
| SNOWTEX C (dispersion of 20 wt. % precipitated silica particles in water) | 15.0 |
| deionized water | 37.6 |
| Keystone Aniline Jet Print Micro Blue (Pigment Blue 15:3; solution containing 20 wt. % pigment solids in water) | 18.0 |

The resulting ink composition had a pH of 8.33, a viscosity at 25° C. of 2.81 centipoise, and a surface tension of 40.6 dynes per centimeter.

EXAMPLE V

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| polyvinyl sulfonate, sodium salt (solution of 25 wt. % polymer in water) | 1.0 |
| sodium lauryl sulfate | 0.2 |
| SNOWTEX DMAC-ST (dispersion of 20 wt. % precipitated silica particles in dimethylacetamide) | 15.0 |
| deionized water | 37.6 |
| Keystone Aniline Jet Print Micro Blue (Pigment Blue 15:3; solution containing 20 wt. % pigment solids in water) | 18.0 |

The resulting ink composition had a viscosity at 25° C. of 4.03 centipoise and a surface tension of 42.3 dynes per centimeter.

EXAMPLE VI

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| sodium lauryl sulfate | 0.15 |
| LUDOX LS (dispersion of 30 wt. % precipitated silica particles in water) | 12.0 |
| deionized water | 23.65 |
| Sunsperse Red RHD9607 (Pigment Red 81:3; solution containing 32.5 wt. % pigment solids in water) | 36.0 |

The resulting ink composition had a pH of 8.02, a viscosity at 25° C. of 2.47 centipoise, and a surface tension of 32.2 dynes per centimeter.

EXAMPLE VII

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| PLURONIC F-38 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.65, a viscosity at 25° C. of 3.00 centipoise, and a surface tension of 42.0 dynes per centimeter.

EXAMPLE VIII

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| LUDOX LS (dispersion of 30 wt. % precipitated silica particles in water) | 6.0 |
| deionized water | 53.8 |
| Bayer Bayscript Yellow P PZD101440 (Pigment Yellow 74; solution containing 32 wt. % pigment solids in water) | 12.0 |

The resulting ink composition had a pH of 6.65, a viscosity at 25° C. of 2.47 centipoise, and a surface tension of 42.0 dynes per centimeter. It is believed that adjustment of the ink pH to at least about 7.5 would improve the shelf stability of the ink.

EXAMPLE IX

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| LUDOX LS (dispersion of 30 wt. % precipitated silica particles in water) | 6.0 |
| deionized water | 55.8 |
| Heucosperse III Yellow Y55320 (Pigment Yellow 74; solution containing 40 wt. % pigment solids in water) | 10.0 |

The resulting ink composition had a pH of 8.23, a viscosity at 25° C. of 2.92 centipoise, and a surface tension of 39.0 dynes per centimeter.

EXAMPLE X

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONICF-38 | 1.8 |
| LUDOX LS (dispersion of 30 wt. % precipitated silica particles in water) | 6.0 |
| deionized water | 54.4 |
| Sunsperse Yellow YHD-9439 (Pigment Yellow 17; solution containing 32.5 wt. % pigment solids in water) | 11.4 |

The resulting ink composition had a pH of 8.3, a viscosity at 25° C. of 2.67 centipoise, and a surface tension of 40.5 dynes per centimeter.

EXAMPLE XI

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| LUDOX LS (dispersion of 30 wt. % precipitated silica particles in water) | 6.0 |
| deionized water | 47.8 |
| Keystone Aniline Jet Print Micro Yellow (Pigment Yellow 13; solution containing 20 wt. % pigment solids in water) | 18.0 |

The resulting ink composition had a pH of 8.65. a viscosity at 25° C. of 2.65 centipoise, and a surface tension of 35.6 dynes per centimeter.

EXAMPLE XII

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| PLURONIC F-38 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Black (Pigment Black 7; solution containing 20 wt. % pigment solids in water) | 18.0 |

The resulting ink composition had a pH of 8.5, a viscosity at 25° C. of 2.69 centipoise, and a surface tension of 40.5 dynes per centimeter.

EXAMPLE XIII

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |
| sodium lauryl sulfate | 0.2 |
| LUDOX LS (dispersion of 30 wt. % precipitated silica particles in water) | 9.0 |
| deionized water | 44.6 |
| Keystone Aniline Jet Print Micro Blue (Pigment Blue 15:3; solution containing 20 wt. % pigment solids in water) | 18.0 |

The resulting ink composition had a pH of 8.64, a viscosity at 25° C. of 2.85 centipoise, and a surface tension of 41.4 dynes per centimeter.

Comparative Example A

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 21.0 |
| trimethylolpropane | 5.4 |
| PLURONIC F-38 | 1.8 |

-continued

| Ingredient | Amount (parts by weight) |
|---|---|
| polyvinyl sulfonate, sodium salt (solution of 25 wt. % polymer in water) | 1.0 |
| sodium lauryl sulfate | 0.2 |
| CABOSPERSE P 1010 (dispersion of 30 wt. % fumed silica particles in water) | 9.0 |
| deionized water | 43.6 |
| Keystone Aniline Jet Print Micro Blue (Pigment Blue 15:3; solution containing 20 wt. % pigment solids in water) | 18.0 |

The resulting ink composition had a pH of 8.82, a viscosity at 25° C. of 3.04 centipoise, and a surface tension of 40.6 dynes per centimeter.

Comparative Example B

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| BRIJ 99 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.57, a viscosity at 25° C. of 2.91 centipoise, and a surface tension of 39.3 dynes per centimeter.

Comparative Example C

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| BRIJ 76 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.67, a viscosity at 25° C. of 2.82 centipoise, and a surface tension of 34.8 dynes per centimeter.

Comparative Example D

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| BRIJ 35 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.51, a viscosity at 25° C. of 2.89 centipoise, and a surface tension of 40.1 dynes per centimeter.

Comparative Example E

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| SURFYNOL 485W | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.60, a viscosity at 25° C. of 2.67 centipoise, and a surface tension of 38.1 dynes per centimeter.

Comparative Example F

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| SURFYNOL 465 | 1.8 |
| sodium lauryl sulfate | 0.15 |

-continued

| Ingredient | Amount (parts by weight) |
|---|---|
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.66, a viscosity at 25° C. of 2.76 centipoise, and a surface tension of 34.4 dynes per centimeter.

Comparative Example G

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| SURFYNOL 440 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.67, a viscosity at 25° C. of over 8.0 centipoise, and a surface tension of 28.8 dynes per centimeter.

Comparative Example H

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| TERGITOL 15-S-40 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.67, a viscosity at 25° C. of 3.12 centipoise, and a surface tension of 39.4 dynes per centimeter.

Comparative Example J

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| TERGITOL 15-S-9 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.67, a viscosity at 25° C. of 3.98 centipoise, and a surface tension of 31.7 dynes per centimeter.

Comparative Example K

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| PLURONIC P-65 | 1.8 |
| sodium lauryl sulfate | 0.15 |
| LUDOX LS (dispersion of 30 wt. % precipitated silica particles in water) | 12.0 |
| deionized water | 42.85 |
| Keystone Aniline Jet Print Micro Magenta (Pigment Red 122; solution containing 20 wt. % pigment solids in water) | 18.0 |

The resulting ink composition had a pH of 8.69, a viscosity at 25° C. of 2.89 centipoise, and a surface tension of 38.2 dynes per centimeter.

Comparative Example L

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| sodium lauryl sulfate | 0.15 |
| LUDOX LS (dispersion of 30 wt. % precipitated silica particles in water) | 12.0 |

-continued

| Ingredient | Amount (parts by weight) |
|---|---|
| deionized water | 42.65 |
| Keystone Aniline Jet Print Micro Magenta (Pigment Red 122; solution containing 20 wt. % pigment solids in water) | 18.0 |

The resulting ink composition had a pH of 8.71, a viscosity at 25° C. of 2.33 centipoise, and a surface tension of 42.2 dynes per centimeter.

Comparative Example M

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| TERGITOL 15-S-40 | 1.8 |
| sodium lauryl sulfate | 0.15 |
| LUDOX LS (dispersion of 30 wt. % precipitated silica particles in water) | 12.0 |
| deionized water | 54.85 |
| Keystone Aniline Jet Print Micro Magenta (Pigment Red 122; solution containing 20 wt. % pigment solids in water) | 18.0 |

The resulting ink composition had a pH of 8.86, a viscosity at 25° C. of 2.74 centipoise, and a surface tension of 39.1 dynes per centimeter.

Comparative Example N

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| BRIJ 99 | 1.8 |
| sodium lauryl sulfate | 0.15 |
| deionized water | 54.85 |
| Keystone Aniline Jet Print Micro Magenta (Pigment Red 122; solution containing 20 wt. % pigment solids in water) | 18.0 |

The resulting ink composition had a pH of 8.85, a viscosity at 25° C. of 2.57 centipoise, and a surface tension of 39.4 dynes per centimeter.

Comparative Example O

An ink composition was prepared by admixing all of the ink ingredients except the pigment dispersion, followed by adding this mixture to the pigment dispersion over a period of about 20 minutes, followed by filtering the resulting ink through a 1 micron glass fiber filter:

| Ingredient | Amount (parts by weight) |
|---|---|
| sulfolane (95 wt. % sulfolane, 5 wt. % water) | 19.8 |
| trimethylolpropane | 5.4 |
| PLURONIC F-38 | 1.8 |
| sodium lauryl sulfate | 0.15 |
| deionized water | 54.85 |
| Keystone Aniline Jet Print Micro Magenta (Pigment Red 122; solution containing 20 wt. % pigment solids in water) | 18.0 |

The resulting ink composition had a pH of 8.90, a viscosity at 25° C. of 2.69 centipoise, and a surface tension of 41.2 dynes per centimeter.

Testing Example

The ink compositions prepared in Examples I through XIII and Comparative Examples A through O were incorporated into H-P® 850C refilled black cartridges and images were printed with the H-P® 850C printer at 600 dpi onto Xerox® Color Expressions paper. The images generated were 100 percent area coverage in normal mode. For further comparison purposes, the Kodak® Professional Ink Jet pigmented inks (cyan, catalogue No. 8329906; yellow, catalogue No. 8315202; magenta, catalogue No. 8109183; and black, catalogue No. 8348864) (referred to below as KC, KY, KM, and KK), the Encad® GO Nova ink jet inks (cyan, yellow, magenta, and black pigmented inks) (referred to below as EC, EY, EM, and EK), and the Hewlett-Packard 51645A black pigmented ink (referred to below as H-P) were incorporated into H-P® 850C cartridges and tested in the same manner. Drop mass (nanograms), solid area density (optical density units), and print quality were observed as follows:

| Ink | Drop Mass | Solid Area Density | Print Quality |
|---|---|---|---|
| I | 41 | 1.37 | no stitch mottle, no streaks |
| II | 41 | 1.39 | no stitch mottle, no streaks |
| III | 39 | 1.35 | no stitch mottle, no streaks |
| IV | 39 | 1.35 | no stitch mottle, no streaks |
| V | — | 1.31 | edge raggedness and satelites visible |
| VI | — | 1.10 | initially good; latency inadequate |
| VII | 41 | 1.37 | no stitch mottle, no streaks |
| VIII | 39 | 0.83 | no stitch mottle, no streaks |
| IX | 39 | 0.95 | no stitch mottle, no streaks |
| X | 39 | 0.82 | no stitch mottle, no streaks |
| XI | 43 | 0.85 | no stitch mottle, no streaks |
| XII | 47 | 1.20 | no stitch mottle, no streaks |
| XIII | 39 | 1.37 | minimal stitch mottle and streaks |
| A | 32 | 1.30 | underfilled solids, early clogging |
| B | 39 | 1.03 | edge raggedness in text; banding in solids |
| C | 39 | 0.91 | edge raggedness in text; banding in solids; drop satellites |
| D | 38 | 1.03 | moderate edge raggedness in text; banding in solids |
| E | 40 | 1.06 | defects in text images; drop satellites; stitch mottle in solids. |
| F | 38 | 0.86 | uniform low optical density solids; stitch mottle; edge raggedness in text |
| G | — | — | not printed because of unstable viscosity |

-continued

| Ink | Drop Mass | Solid Area Density | Print Quality |
|---|---|---|---|
| H | 36 | 1.02 | uniform low optical density solids; moderate edge raggedness in text |
| J | 37 | 0.86 | uniform low optical density solids; stitch mottle; edge raggedness in text |
| K | 42 | 1.37 | jet dropout in text images; stitch mottle |
| L | 38 | 0.89 | uniform low optical density solids |
| M | 38 | 0.93 | moderate edge raggedness in text; banding in solids |
| N | 36 | 1 | defects in text images; drop satellites; banding in solids |
| O | 32 | 1.1 | weak jetting; underfilled solids; banding |
| EC | 32 | 0.82 | stitch mottle, streaky, underfilled |
| EM | 31 | 0.86 | stitch mottle, streaky, underfilled |
| EY | 33 | 0.82 | stitch mottle, streaky, underfilled |
| EK | 32 | — | — |
| KC | — | 0.966 | — |
| KM | — | 0.992 | — |
| KY | — | 0.81 | — |
| KK | — | 1.04 | — |
| H-P | 36 | 1.54 | no stitch mottle, no streaks |

—means not measured

The prints generated on paper with the Encad® inks all curled into tight scrolls in less than one minute after printing. In addition, the images printed with the Encad® yellow ink were almost completely removed from the paper by soaking in water. The inks of Examples VIII and X also generated clear projecting yellow images when printed onto transparency stock. Only the inks containing both the surfactant of the formula

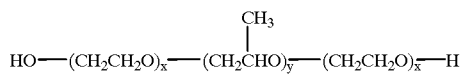

(wherein the molecular weight of the polypropylene oxide block is about 900 and the ethylene oxide blocks constitute about 80 percent by weight of the molecule) and the precipitated silica particles exhibited both high drop volume and desirably high optical density and print quality in solid print areas.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (a) water, (b) a surfactant of the formula

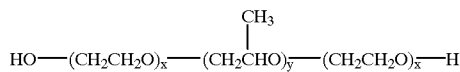

wherein the molecular weight of the polypropylene oxide block is about 900 and the ethylene oxide blocks constitute about 80 percent by weight of the molecule, (c) colored pigment particles, and (d) uncolored precipitated colloidal silica particles, wherein the ink has a pH of at least about 7.5 when measured at about 25° C.

2. An ink composition according to claim 1 wherein the ink further contains a cosolvent selected from the group consisting of sulfolane, trimethylolpropane, 2-pyrrolidinone, glycerine, and mixtures thereof.

3. An ink composition according to claim 1 wherein the surfactant is present in the ink in an amount of from about 0.1 to about 5 percent by weight of the ink.

4. An ink composition according to claim 1 wherein the colored pigment particles are present in the ink in an amount of at least about 0.1 percent by weight of the ink.

5. An ink composition according to claim 1 wherein the colored pigment particles are present in the ink in an amount of from about 0.1 to about 8 percent by weight of the ink.

6. An ink composition according to claim 1 which contains substantially no dye molecules.

7. An ink composition according to claim 1 further containing a pigment dispersing or stabilizing agent.

8. An ink composition according to claim 1 with a pH of at least about 8.5.

9. An ink composition according to claim 1 wherein the precipitated silica particles are present in the ink in an amount of from about 0.1 to about 8 percent by weight of the ink.

10. An ink composition according to claim 1 wherein the precipitated silica particles have an average particle diameter of from about 5 to about 50 nanometers.

11. An ink composition according to claim 1 wherein the ratio by weight of colored pigment particles to uncolored precipitated colloidal silica particles is from about 3:1 to about 1:2.

12. An ink composition according to claim 1 wherein the ratio by weight of colored pigment particles to uncolored precipitated colloidal silica particles is from about 2:1 to about 1:1.5.

13. A printing process which comprises (a) incorporating an ink composition according to claim 1 into an ink jet printing apparatus; and (b) causing droplets of the ink to be ejected in an imagewise pattern onto a recording sheet.

14. A process according to claim 13 wherein the printing apparatus employs a thermal ink jet process wherein the ink in the nozzles is selectively heated in an imagewise pattern, thereby causing droplets of the ink to be ejected in imagewise pattern.

15. A process according to claim 13 wherein the recording sheet is plain paper.

16. A process according to claim 13 wherein the recording sheet is a transparency.

17. A process according to claim 13 wherein the recording sheet is a photopaper.

18. A process according to claim 14 wherein the ink droplets have an average drop mass of at least about 32 nanograms per drop.

19. A process according to claim 14 wherein the ink droplets have an average drop mass of from about 35 to about 45 nanograms per drop.

20. A process according to claim 14 wherein the ink droplets have an average drop mass of from about 38 to about 42 nanograms per drop.

* * * * *